May 29, 1962 J. F. NELSON ET AL Re. 25,175
MULTI-STATION SURFACE MOUNTED PLUMBING FIXTURE
Original Filed Nov. 28, 1958 2 Sheets-Sheet 1
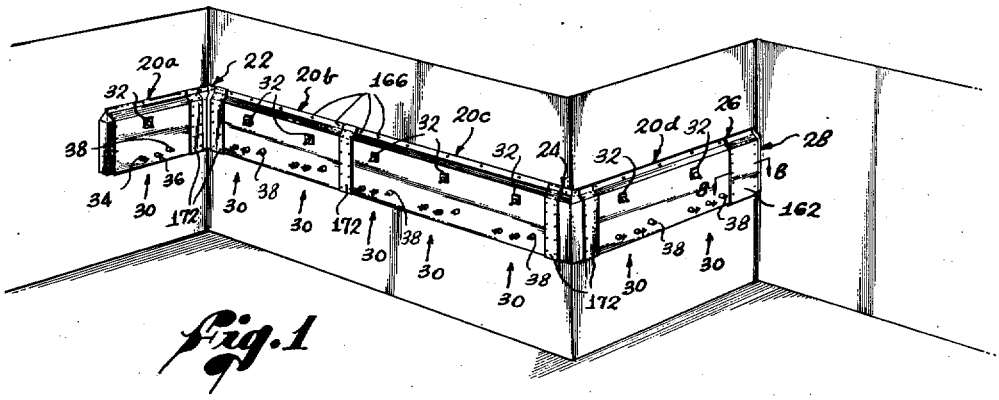
Fig. 1
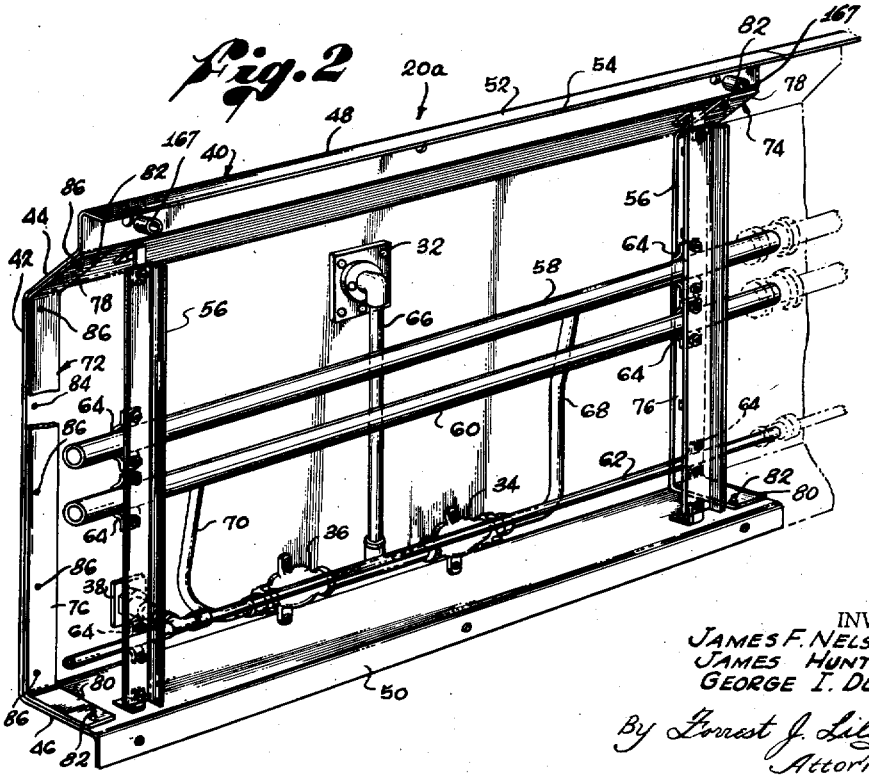
INVENTORS
JAMES F. NELSON
JAMES HUNT
GEORGE I. DOTY
By Forrest J. Lilly
Attorney

MULTI-STATION SURFACE MOUNTED PLUMBING FIXTURE

Original Filed Nov. 28, 1958 2 Sheets-Sheet 2

INVENTORS
JAMES F. NELSON
JAMES HUNT
GEORGE I. DOTY
By Forrest J. Lilly
Attorney United States Patent Office Re. 25,175
Reissued May 29, 1962

25,175

MULTI-STATION SURFACE MOUNTED PLUMBING FIXTURE

James F. Nelson, Woodland Hills, James Hunt, Whittier, and George I. Doty, La Canada, Calif., assignors to Logan Manufacturing Company, Glendale, Calif., a corporation of California Original No. 2,992,438, dated July 18, 1961, Ser. No. 776,941, Nov. 28, 1958. Application for reissue Jan. 15, 1962, Ser. No. 166,990
7 Claims. (Cl. 4—192)

Matter enclosed in heavy brackets [ ] appears in the original patent but forms no part of this reissue specification; matter printed in italics indicates the additions made by reissue

This invention deals generally with plumbing fixtures, and more particularly with a multi-station, surface mounted plumbing fixture.

In the past, the several stations of a multi-station plumbing installation, such as the multi-station shower installations required in schools and certain other large establishments, were generally supplied with hot and cold water, and in some cases with liquid soap, through a system of piping which was installed prior to completion of the building walls. This piping consisted of main supply headers located between the walls and branch pipes which lead from the headers, through the building walls, to each station.

These branch pipes were installed prior to plastering and finishing of the walls. The several fittings of each station, such as a shower head, valves and a soap dispensing head, were individually connected to the branch lines and mounted on the building walls at some stage in the completion of the latter.

This type of plumbing installation, while suitable for homes and other small establishments, is not satisfactory for large, multi-station installations since it delays finishing of the building walls, and is excessively costly and time consuming.

A broad object of the present invention is to provide a multi-station plumbing fixture of the character described which may be mounted on the walls of a building after the walls are completely finished.

A more specific object of the invention is to provide a surface mounted, multi-station plumbing fixture of the character described which may be readily prefabricated.

Another object of the invention is to provide a surface mounted, multi-station plumbing fixture of the character described consisting of a plurality of standard, prefabricated units designed to be mounted in end-to-end fashion in such a way as to accommodate installation of the fixture in rooms of various sizes and shapes.

Yet another object of the invention is to provide a surface mounted, multi-station plumbing fixture of the character described which embodies both inside and outside corner units to permit mounting of the fixture on right angle walls of a building.

A further object of the invention is to provide a surface mounted, multi-station plumbing fixture of the character described embodying units which are extensible to adjust the overall length of the fixture or a portion thereof to permit mounting of the fixture on walls having different horizontal dimensions.

Yet a further object of the invention is to provide a surface mounted, multi-station plumbing fixture of the character described made up of prefabricated units equipped with liquid supply pipes extending between the ends of the respective units, opposite ends of which pipes are open and exposed at the ends of each unit to permit mounting of several of the units in end-to-end fashion on a building wall with the exposed ends of the supply pipes on adjacent units coupled whereby the several units may be supplied with liquid soap and water through common supply lines connecting to one of the units.

An object of the invention closely related to the foregoing object is to provide a plumbing fixture of the character described in which certain of the prefabricated units are equipped with one or more groups of fittings, such as shower heads, valves and liquid soap dispensers, each making up a station of the fixture.

A still further object of the invention is to provide various type of prefabricated fixture units for a surface mounted, multi-station plumbing fixture of the character described.

A still further object of the invention is to provide a surface mounted, multi-station plumbing fixture of the character described and prefabricated fixture units therefor which are relatively simple in construction, inexpensive to manufacture, pleasing in appearance, and otherwise ideally suited to their intended purposes.

Other objects, advantages and features of the invention will become readily apparent as the description proceeds.

Briefly stated, the plumbing fixture of the invention consists of a series of prefabricated, standard units of various shapes and sizes which are designed for mounting in end-to-end fashion on the finished walls of the building. Certain of these units have a flat, panel-like construction and mount one or more groups of plumbing fittings, such as shower heads, valves and liquid soap dispensers, each of which groups forms a station of the finished, multi-station plumbing fixture. These panel units are prefabricated in different standard lengths and may have one, two, three, four or more stations, depending on the length of the panel. Each such panel unit is designed to be mounted flush against a flat portion of a building wall.

Other units of the present plumbing fixture have a generally right angular configuration in horizontal section and form either inside or outside corner units. These corner units are designed to be mounted in the corners of a room in such a way as to interconnect a pair of panel units which are mounted on right angular walls of a building.

Each of these corner units embodies extensible connections or joints for attachment to the adjacent panel units so as to permit limited longitudinal adjustment of the panel units with respect to the corner units. This adjustment permits the overall length of each section of the present plumbing fixture extending between adjacent corners of a room to be varied to match the length of the wall between such adjacent corners.

In some installations of the present plumbing fixture, it is desirable or necessary that one end of the fixture dead end flush against a building wall extending at right angles to the wall on which the adjacent portion of the fixture is mounted. For this situation, the invention provides right and left hand extension panel units which are designed to be mounted between the end of a main panel unit and the right angular building wall. The adjustment afforded by these extension units permits compensation to be made for variations in the spacing between the end of the main panel unit and the right angular building wall so as to enable the fixture to dead end flush against the latter wall, as mentioned.

Each of the prefabricated units mounts liquid supply piping such as hot and cold water supply pipes and liquid soap supply pipes, behind the front panel of the unit. These pipes, which extend between opposite ends of the respective units, have their opposite ends open and exposed at the ends of the units to permit coupling of the pipes on one unit to the pipes on an adjacent unit. The shower heads, soap dispensers or other fittings on the main panel units are connected to the appropriate pipes on the respective units.

The present surface mounted, multi-station plumbing fixture may be provided with any desired number of stations and may be adapted to installation in rooms of various sizes and shapes by proper selection and arrangement of the various prefabricated units of the invention. The plumbing fixture of the invention is relatively inexpensive to manufacture, easy to install, and very pleasing in appearance.

The invention will be disclosed with reference to a shower fixture in which each station of the fixture comprises a shower head, valves for regulating flow of hot and cold water to the shower head, and a liquid soap dispenser. It will become clear as the description proceeds, however, that each station may comprise, for example, only a shower head or a faucet in lieu of a shower head. Also, the several stations of the fixture may be supplied with temperate water at the proper temperature, in which case each unit will have only a single water supply pipe and a single valve for regulating flow of water from this pipe to the outlet fitting of each station.

A better understanding of the invention may be had from the following detailed description thereof, taken in connection with the annexed drawings, wherein:

FIG. 1 is a view in perspective, of the various prefabricated units of the invention mounted on the walls of a building so as to form a surface mounted, multi-station shower fixture according to the invention;

FIG. 2 is an enlarged rear view in perspective of one of the main panel units of the invention;

Figure 4:
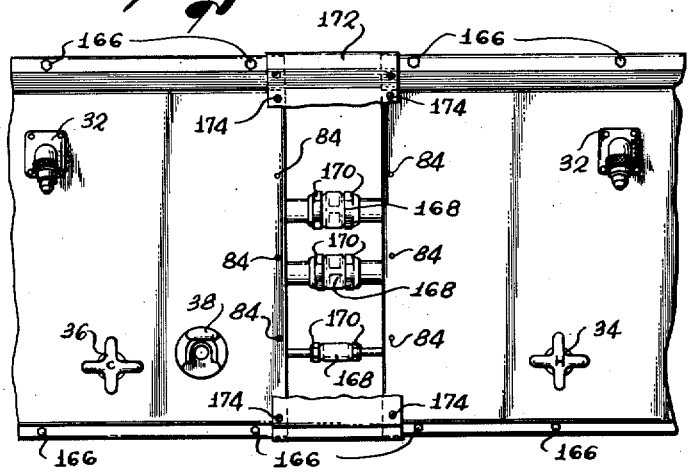
FIG. 4 is a partial view in front elevation of a pair of main panel units and illustrating the manner of coupling the supply pipes of the units.

As preliminarily mentioned, the present invention provides a series of prefabricated, standard units which are designed to be mounted on the surface of a finished wall in end-to-end fashion in such a way as to provide a multi-station plumbing or shower fixture, such as illustrated in FIG. 1. These prefabricated units of the invention comprise main panel units 20a, 20b, 20c and 20d, an inside corner unit 22, an outside corner unit 24, an extension panel unit 26, and an extension joint 28. Each shower station 30 of the shower fixture includes a shower head 32, hot and cold water taps 34 and 36, and a liquid soap dispensing head 38.

The several main panel units 20a, 20b, 20c and 20d are identical except for their different lengths and their different number of shower stations. Thus, panel unit 20a is relatively short and has a single shower station 30. Panel unit 20b is of medium length and has two shower stations. Panel unit 20c is relatively long and has three shower stations. Obviously, main panel units longer than panel unit 20c having more than three shower stations may be made.

Because of this similarity of the main panel units, only one unit, namely, panel unit 20a, illustrated in FIG. 2, will be described. In view of what has just been said, it will be apparent that the following description of the main panel unit 20a will apply equally well to the remainder of the main panel units, except as to the number of shower stations on the unit.

Panel unit 20a comprises a hollow housing 40, the rear or wall side of which is open, as shown in FIG. 2. Housing 40 has a front, sheet metal panel 42 and open, normally vertical ends. The front panel 42 of the housing may be made, for example, from a sheet of stainless steel.

The metal sheet comprising the front panel 42 is rearwardly folded along the normally upper and lower longitudinal edges of the front panel to form an upper inclined panel portion 44 and a lower, normally horizontal panel portion 46 which extends perpendicular to the front panel 42. These panel portions are flanged along their rear edges to provide an upper, generally L-shaped flange 48, and a lower flange 50.

One leg 52 of the upper flange 48 is disposed in a normally horizontal plane perpendicular to the front panel 42. The lower flange 50 is disposed in a normally vertical plane parallel to the front panel 42 and is approximately coplanar with the rear edge 54 of the upper flange 48. When the panel unit 20a is mounted on a wall, edge 54 of the upper flange 48 and flange 50 flatly engage the wall surface.

Located within the housing 40, adjacent opposite ends of the latter, are a pair of vertical angles or pipe supports 56. The upper and lower ends of these pipe supports are attached to the panel portions 44 and 46 of the housing in the manner illustrated. The pipe supports are spaced rearwardly from front panel 42, as shown.

Extending lengthwise of the housing 40, within the latter, and behind the front panel 42, are a hot water supply pipe 58, a cold water supply pipe 60 and a liquid soap supply pipe 62. These pipes are rigidly mounted on the forward sides of the pipe supports 56 by means of U-shaped brackets 64 bolted to the supports.

Supply pipes 58, 60 and 62 have approximately the same length which is slightly greater than the length of the housing 40. The pipes are longitudinally centered with respect to the housing so that opposite ends of the pipes extend a distance beyond the ends of the housing as may be most readily observed in FIG. 4. The ends of the pipes are thus exposed at the ends of the housing and, prior to attachment of the unit to other units, are open, as shown in FIG. 2.

Shower head 32 is connected to the hot and cold water pipes 58 and 60 through a riser 66 and a pair of hot and cold water branch pipes 68 and 70. The hot and cold taps 34 and 36 are connected in the usual way in the branch pipes 68 and 70. The soap dispensing head 38 is connected directly to the soap supply line 62, as shown in FIG. 2.

Located within opposite ends of the housing 40 are a pair of anchor strips 72 and 74. These anchor strips are preferably constructed of relatively heavy gauge steel.

The anchor strips, which are bent to conform to the configuration of the front panel 42 and panel portions 44 and 46, have a central portion 76 which is flatly engageable with the rear surface of the front panel 42. Opposite ends 78 and 80 of the anchor strips are bent into parallelism with and are flatly engageable with the inner surfaces of the panel portions 44 and 46.

The anchor strips 72 and 74 are secured to the housing 40 by screws 82 which pass through panel portions 44 and 46 and the bent ends 78 and 80 of the anchor strips. The sheet metal panel of the housing 40 and the anchor strips have aligned holes 84 and 86 to receive attaching screws for connecting adjacent units. The holes 86 in the anchor strips are threaded.

The holes in the sheet metal panel of the housing 40 through which the anchor strip attaching bolts 82 pass, as well as the panel holes 84 for receiving other attaching screws are slightly enlarged to permit limited adjustment of the anchor strips with respect to the housing. This floating action of the anchor strips facilitates lining up attaching screw holes on adjacent units with holes in certain overlay panels, to be described, when the units are mounted on a wall.

As mentioned earlier, the other main panel units 20b, 20c and 20d are identical to panel unit 20a, just described, except for their longer length and increased number of shower stations 30. Also, the longer panel units have additional pipe supports 56.

Figure 5:
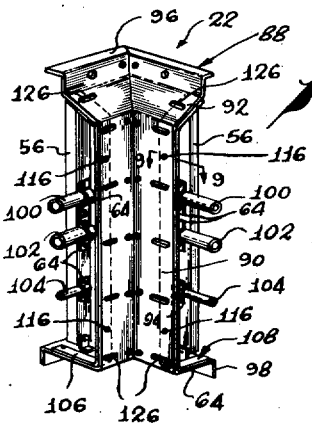
FIG. 5 is an enlarged perspective view of an inside corner unit embodied in the shower fixture of FIG. 1.

Referring now to FIG. 5, the inside corner unit 22 will be seen to comprise a hollow housing 88 which is open at its rear or wall side and has a configuration, in vertical section, substantially identical to that of the housing 40 of the main panel units. Thus, the housing 88 has a front panel 90, an upper inclined panel portion 92, a lower, normally horizontal panel portion 94, and upper and lower, rearwardly offset flanges 96, 98 for engaging a wall surface.

The corner unit 22, in horizontal section, has a generally right angular configuration, as shown, so as to be capable of fitting the inside corner of a room, in the manner illustrated in FIG. 1. The front panel, panel portions and flanges of the corner unit 22 accordingly comprise right angularly extending sections.

Mounted within the housing 88, behind the front panel 90, are hot and cold water supply pipes 100 and 102, respectively, and a liquid soap supply pipe 104. These pipes are mounted on pipe supports 56 in the same manner as the supply pipes in the main panel unit 20a. As shown in FIG. 5, the supply pipes in the corner unit have a right angle bend so as to conform to the right angular configuration of the corner unit. The ends of these supply pipes are open and exposed at the normally vertical, right angularly disposed ends of the housing to permit coupling of the pipes to the pipes of the main panel units.

Figure 3:
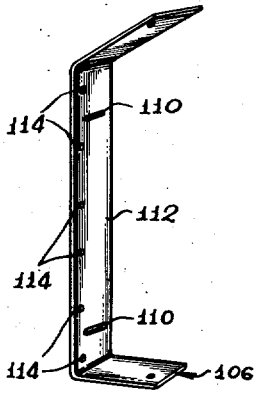
FIG. 3 is a detail in perspective of an anchor strip embodied in certain of the units of FIG. 1.

As preliminarily mentioned, the corner units, including the inside corner unit of FIG. 5, have extensible connections or joints to permit limited adjustment of the main panel units with respect to a corner unit to which they are attached. These extension joints comprise a pair of floating anchor strips 106 and 108 which are similar in shape to the anchor strips on the main panel units and are positioned behind the front panel 90 and upper and lower panel portions 92 and 94 of the corner units in the manner illustrated in FIG. 5. Referring now to FIG. 3, anchor strip 106 will be seen to comprise a pair of laterally extending slots 110 located adjacent the opposite ends of the normally vertical, intermediate portion 112 of the strip. Also extending through the portion 112 of the anchor strip, adjacent the left-hand edge of the latter as it is viewed in FIG. 3, are a series of threaded holes 114. Anchor strip 108 is identical to anchor strip 106, just described, except for the fact that the holes 114 in the anchor strip 108 are along the right edge of the strips, as viewed in FIG. 3.

Figure 9:
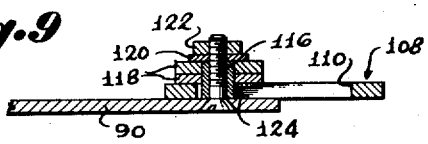
FIG. 9 is an enlarged section taken along line 9—9 of FIG. 5.

Each of the anchor strips 106 and 108 is attached to the front panel 90 of the corner unit by a pair of bolts 116 which pass through countersunk holes in the front panel 90 and the slots 110 in the anchor strips, as may be best observed in FIG. 9. Each of the bolts 116 carries a pair of washers 118 of a size to engage the respective anchor strip at opposite sides of the adjacent slot 110, a lock washer 120, and a nut 122. A spacer bushing 124 mounted on each bolt 116 abuts, at opposite ends, the front panel 90 and lock washer 120. The [diameter] *diameters* of the bushings 124 are such that each bushing has a sliding fit in its respective anchor strip slot 110. The length of the spacer bushings 124 is such that when the lock washers 120 are firmly clamped against the rear ends of the bushings by the nuts 122, sufficient clearance exists between the front panel 90, washers 118 and the anchor strips to enable slidable lateral adjustment of the latter.

Formed in the front panel 90 of the corner unit, adjacent the opposite ends of the latter, are vertical rows of slots 126 which parallel the direction of lateral adjustment of the anchor strips. Each of these slots is aligned with one of the threaded holes 114 in the adjacent anchor strip. As will presently be seen, overlay panels, which bridge adjacent units of the present fixture, are attached to the corner panel unit, just described, by passing attaching screws through holes along one edge of the overlay panel and threading such screws into the threaded holes 114 in the anchor strips of a corner unit. The adjustability of the anchor strips on the corner unit [permit] *permits* limited endwise adjustment of main panel units with respect to the corner unit.

Figure 6:
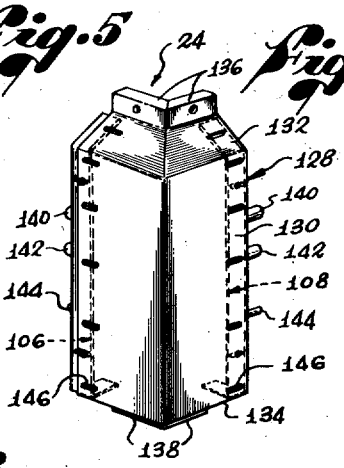
FIG. 6 is an enlarged perspective view of an outside corner unit embodied in the shower fixture of FIG. 1.

The outside corner unit 24, illustrated in detail in FIG. 6, is generally similar to the inside corner unit just described, except of course that the corner unit of FIG. 6 conforms to an outside rather than an inside corner. Thus, the outside corner unit 24 comprises a housing 128 identical in configuration, in vertical section, to the housing 88 of the inside corner unit. The outside corner unit housing has a front panel 130, upper inclined and lower normally horizontal panel portions 132 and 134, respectively, and rearwardly offset upper and lower wall engaging flanges 136 and 138, respectively.

The hot and cold water pipes 140 and 142 and the soap supply pipe 144, which are mounted in the housing 128 behind the front panel 130, in the same manner as the supply pipes of the main panel unit of FIG. 2 and the inside corner unit of FIG. 5, have right angle bends in conformance with the right angular configuration of the outside corner unit in horizontal section. Opposite ends of the supply pipes 140, 142 and 144 are open and exposed at the opposite, normally vertical and right angularly related ends of the housing 128.

Mounted within opposite ends of the housing, behind the front panel 130, are a pair of the aforedescribed floating anchor strips 106 and 108. These anchor strips are attached to the outside corner unit in the same manner as described with reference to the inside corner unit of FIG. 5. The front panel of the outside corner unit is also provided, at opposite ends of the unit, with vertical rows of slots 146 which are aligned with the threaded holes 114 in the anchor strips.

Figure 7:
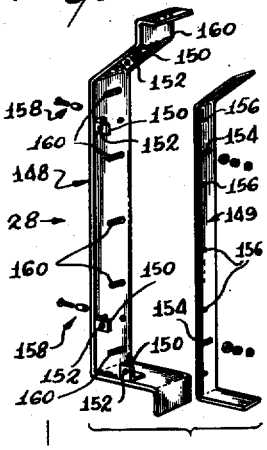
FIG. 7 is an exploded view in perspective of an extension joint embodied in the shower fixture of FIG. 1.

The extension joint 28 of FIG. 1 is illustrated in exploded fashion in FIG. 7. This joint comprises a main, relatively stationary housing or anchor strip 148 and a floating anchor strip 149. Stationary anchor strip 148 has a configuration in vertical section identical to that of the main panel units.

Rigidly attached to the inner, or rear side of the stationary anchor strip 148 along one edge of the latter, are a series of right angle mounting brackets 150. One leg of these brackets [extend] *extends* normal to the plane of the anchor strip and [have their] *has its* outer [faces] *face* located approximately in the plane of the adjacent edge of the strip. These mounting brackets have holes 152.

As will be presently more fully described, the extension joint 26 is used in those instances where one or both ends of the present surface mounted fixture is to dead end at a right angle wall in the manner illustrated in FIG. 1. The stationary anchor strip is attached to the right angle wall by mounting bolts by passing through the holes 152 in the mounting brackets 150 of the strip.

The floating anchor strip 149 of the extension joint 126 is identical to the floating anchor strip 106 previously described. This floating anchor strip 149 (FIG. 7) has, in the same fashion as the anchor strip 106, a pair of lateral slots 154 and a series of threaded holes 156. Floating anchor strip 149 is attached to the stationary anchor strip 148 by a pair of fastening means, generally indicated at 158, which are identical to the fastening means employed for attaching the anchor strips 106 and 108 to the front panels of their respective corner units. These fastening means 158 pass through the slots 154 in the floating anchor strip 149 so as to render the latter capable of limited lateral adjustment on the stationary anchor strip 148.

The stationary anchor strip is formed with a series of lateral slots 160 aligned with the threaded openings 156 in the floating anchor strip.

The extension joint 26 is made in both a right hand and left hand version. The left hand version of the extension joint is a mirror image of the right hand extension joint illustrated in FIG. 7. Such a right hand extension joint is not embodied in the fixture of FIG. 1.

Figure 8:
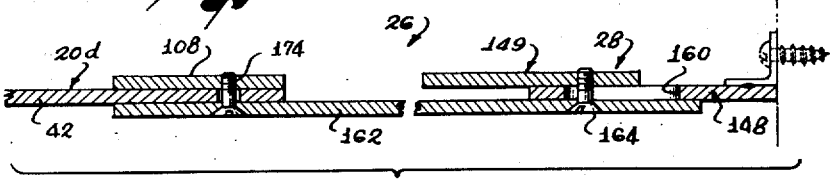
FIG. 8 is an enlarged section taken along line 8—8 of FIG. 1.

The extension panel unit 26 comprises the extension joint just described and is completed by a narrow overlay panel 162 (FIGS. 1 and 8). This overlay panel is similar in configuration in vertical section to the panel of the main panel units and proportioned to fit over the end of a main panel unit in the manner illustrated in FIG. 1. One edge of this overlay panel is attached to the floating anchor strip 149 of the extension joint by attaching screws 164 which pass through the slots 160 in the stationary anchor strip of the joint and are threaded into the floating anchor strip 149 of the joint in the manner illustrated most clearly in FIG. 8. The other, normally vertical edge of the overlay panel is formed with a series of holes to receive attaching screws for attaching the overlay panel to a main panel unit, in the manner illustrated in FIGS. 1 and 8.

To make a completed, multi-station shower fixture, such as illustrated in FIG. 1, a plurality of the prefabricated units just described are mounted in end-to-end fashion on the surface of finished building walls by means of mounting screws 166 which pass through the upper and lower, rearwardly offset flanges on the units, as shown in FIG. 1. Suitable wall engaging spacers 167 (FIG. 2) are provided at the rear of the panel flanges at each location of a mounting screw.

When mounting the units, the latter are arranged so that adjacent ends of adjacent units are spaced in the manner illustrated in FIG. 4 to permit joining of the supply pipes on the adjacent units. It will be observed in FIG. 4 that the supply pipes on the several units are so vertically located on the latter as to be longitudinally aligned when the units are mounted in end-to-end fashion. The couplings 168 may comprise any suitable type of coupling, such as a slip joint coupling member, which is secured to the respective pipes by tightening clamp nuts 170 at opposite ends of the coupling, or a soldered union, for example.

The gaps between the adjacent units are then covered by means of overlay panels 172. These overlay panels are shaped and proportioned to fit over the outside of the prefabricated units, as shown. The overlay panels between adjacent main panel units are secured to the latter by attaching screws 174 which pass through a series of holes along the vertical edges of the overlay panel and the holes 84 in the ends of the main panel units and are threaded in the holes 86 of the anchor strips 72 and 74 of the main panel units. In the case of a main panel unit and a corner unit 22 or 24, the attaching screws for the overlay panel pass through the slots 126 or 146 in the corner unit and are threaded into the floating anchor strip 106 or 108 of the corner unit. The overlay panel 162 of the extension unit 26 is attached to the end of a main panel unit, in the manner illustrated in FIG. 8, by attaching screws 174 which pass through the overlay panel and are threaded in the anchor strip of the main panel unit. Stationary anchor strip 148 of the extension panel unit is bolted to a right angular wall in the manner previously described. The coupled supply pipes in the fixture will, of course, be connected at some point along the fixture, to hot and cold water and soap supply pipes (not shown) of the building, and will be suitably capped at their ends.

It will be apparent from the preceding description that by proper selection and placement of the various prefabricated units of the invention, a finished, multi-station shower fixture may be made to conform to a room of substantially any shape and size. As mentioned, the several adjustments afforded by the extension panel units 26 and the adjustable connections embodied in the corner units 22 and 24 permit limited adjustment of the lengths of the various sections of the fixture to accommodate the sections to walls of various dimensions as well as dead ending of one or both ends of the fixture against right angular walls. The anchor strips uniquely serve a dual function of reinforcing the sheet metal housings of the panel units as well as a means to join adjacent units.

It will be clear, therefore, that there has been described and illustrated a surface mounted, multi-station shower fixture and prefabricated units therefor which are fully capable of attaining the several objects and advantages preliminarily set forth.

While preferred embodiments of the invention have been disclosed for illustrative purposes, numerous modifications in design and arrangement of parts and instrumentalities of the invention are possible within the scope of the following claims.

We claim:

1. An expansion unit for a prefabricated surface mounted plumbing fixture of the character described, comprising a narrow relatively stationary anchor strip having a front side and rearwardly offset flanges at opposite ends for seating against a building wall, means to attach the strip to the building, a floating anchor strip behind and parallel to the stationary strip, means loosely securing the floating strip to the stationary strip for limited lateral adjustment of the floating strip on the stationary strip, said floating strip having a series of screw holes spaced therealong, and said stationary strip having a slot aligned with each screw hole and extending parallel to the direction of adjustment of the floating strip on the stationary strip.

2. A prefabricated unit for a surface mounted plumbing fixture of the character described, comprising a sheet metal housing having normally vertical open ends and a front panel, upper and lower edge portions of which are bent rearwardly to form rearwardly extending top and bottom panels of the housing, the rear edge portions of said top and bottom panels being bent [outwardly] to form rearwardly offset flanges for seating against the wall of a building, [there being holes in said flanges to receive bolts] *means* for mounting the housing to said wall, at least one liquid supply pipe permanently mounted in said housing behind said front panel and extending between said ends of the housing, opposite ends of said pipe being open, a pair of relatively heavy reinforcing anchor strips behind said front panel at and parallel to the ends of the housing, each anchor strip having a central portion seating against the inner surface of the front panel and rearwardly bent ends which seat against the inner surfaces of said top and bottom panels, respectively, to reinforce the housing, means securing said anchor strips to the housing, and said front panel and anchor strips having aligned screw holes to receive attaching screws for connecting the unit to other units.

3. A prefabricated unit for a surface mounted plumbing fixture of the character described, comprising a sheet metal housing having open, normally vertical ends and including a front panel, upper and lower edge portions of which are bent rearwardly to form rearwardly extending top and bottom panels of the housing, and rear edge portions of said top and bottom panels being bent [outwardly] to form rearwardly offset flanges for seating against the wall of a building, [there being holes in said flanges to receive bolts] *means* for mounting the housing to said wall, at least one liquid supply pipe permanently mounted in said housing behind said front panel and extending between said ends of the housing, opposite ends of said pipe being open, a pair of relatively heavy reinforcing anchor strips behind said front panel at and parallel to the end of the housing, each anchor strip having a central portion seating against the inner surface of the front panel and rearwardly bent ends which seat against the inner surfaces of said top and bottom panels, respectively, to reinforce the housing, means connecting said anchor strips to said front panel for limited lateral adjustment of the strips lengthwise of the housing, said anchor strips having longitudinally spaced screw holes to receive attaching screws for connection of the unit to other units, and said front panel having slots aligned with said anchor strip holes and extending lengthwise of the housing.

4. An expansion unit for a prefabricated surface mounted plumbing fixture of the character described, comprising a housing having normally vertical open ends, and a front panel, upper and lower edge portions of which are bent rearwardly to form rearwardly extending top and bottom panels of the housing, rear edge portions of said top and bottom panels being bent [outwardly] to form rearwardly offset flanges for seating against the surface of a wall, means to attach said housing to the wall, a floating anchor strip behind and parallel to the ends of the housing, means securing said strip to the housing for limited lateral adjustment of the strip endwise of the housing, said strip having a series of screw holes spaced therealong, and said housing having a slot aligned with each screw hole and extending in the endwise direction of the housing.

5. An expansion unit for a prefabricated surface mounted plumbing fixture of the character described, comprising a housing having open, normally vertical ends and a front panel, upper and lower edge portions of which are bent rearwardly to form rearwardly extending top and bottom panels of the housing, rear edge portions of said top and bottom panels being bent [outwardly] to form rearwardly offset flanges for seating against the surface of a wall, means to attach said housing to the wall, a floating anchor strip behind and parallel to the ends of the housing, means including aligned slots and screw holes in said housing and strip and screws extending through the slots and holes for loosely securing the strip to the housing for limited lateral adjustment of the strip endwise of the housing, said strip having additional screw holes spaced therealong, and said housing having an additional slot aligned with each additional screw hole and extending in the endwise direction of the housing.

6. An expansion unit for a prefabricated surface mounted plumbing fixture of the character described, comprising a housing having open, normally vertical ends and a front panel, upper and lower edge portions of which are bent rearwardly to form rearwardly extending top and bottom panels of the housing, rear edge portions of said top and bottom panels being bent [outwardly] to form rearwardly offset flanges for seating against the surface of a wall, means to attach said housing to the wall, a floating anchor strip behind and parallel to said ends of the housing, means loosely securing said strip to the housing for limited lateral adjustment of the strip endwise of the housing, said strip having a series of screw holes spaced therealong, and said housing having a slot aligned with each screw hole and extending in the endwise direction of the housing, a cover panel having a shape similar to and an edge portion overlying said housing, said edge portion of the cover panel having screw holes aligned with the screw holes in the floating anchor strip, and attaching screws passing through the aligned screw holes and slots for securing said cover panel to the floating anchor strip.

7. The subject matter of claim 6 wherein said holes in the cover panel are spaced from the adjacent edge of the cover panel a distance at least as great as the length of the slots in said housing, whereby said slots are covered by the cover panel in every position of adjustment of the cover panel and floating anchor strip relative to said housing.

References Cited in the file of this patent or the original patent

UNITED STATES PATENTS

| | | |
|---|---|---|
| 896,420 | Stoker et al. | Aug. 18, 1908 |
| 898,616 | Williamson | Sept. 15, 1908 |
| 2,645,783 | Allen | July 21, 1953 |
| 2,670,935 | Arnold | Mar. 2, 1954 |
| 2,825,909 | Morris | Mar. 11, 1958 |
| 2,855,186 | Brinen | Oct. 7, 1958 |